2 Sheets—Sheet 1.

A. B. Richmond,
Making Fellies.

Nº 14,987.            Patented May 27, 1856.

AM. PHOTO-LITHO. CO. N.Y. (OSBORNE'S PROCESS.)

2 Sheets—Sheet 2.

A. B. Richmond,
Making Fellies.

Nº 14,987. Patented May 27, 1856.

UNITED STATES PATENT OFFICE.

A. B. RICHMOND, OF MEADVILLE, PENNSYLVANIA.

MACHINE FOR MANUFACTURING FELLIES.

Specification of Letters Patent No. 14,987, dated May 27, 1856.

*To all whom it may concern:*

Be it known that I, A. B. RICHMOND, of Meadville, in the county of Crawford and State of Pennsylvania, have invented a new and useful Machine for Sawing and Boring Fellies; and I do hereby declare that the following is a full and exact description of the construction and operation of the same, reference being had to the annexed drawings, and letters of reference marked thereon, making a part of this specification.

Figure 1:
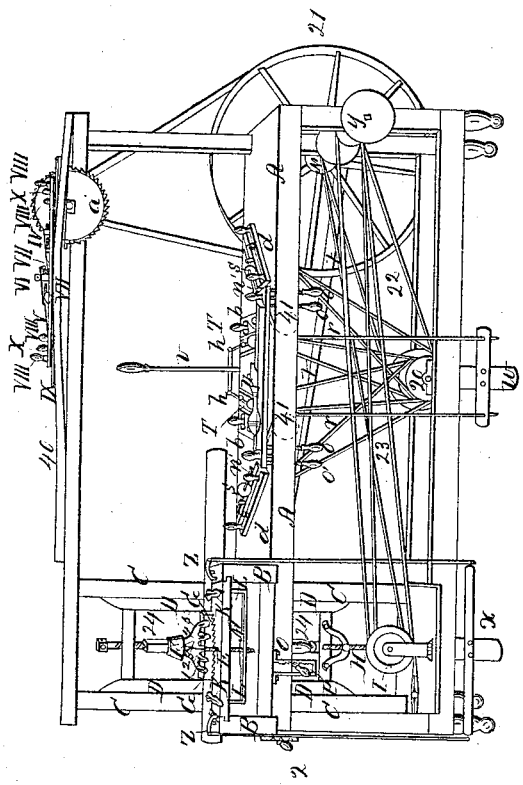

Figure 1 represents a perspective view of my machine with all its parts as far as they can be represented, adjusted in working order; A A is the top of the bench or table on which the sawing and boring apparatus is constructed; C, C, C, C, are two upright guide posts in which the saw frame D, D, D, D, is moved up and down to feed the saws G, G, by means of a screw shaft H on which is a bevel gear wheel which is driven by another bevel gear wheel on a shaft with band pulleys as shown at S, Fig. 5. In the saw frame D, D, D, D, there is hung an upright shaft 24, 24, on which the saw arm F (Figs. 1, 3 and 5,) is hung and extends out at right angles to the said shaft. The saw arm F ends in a hand, one of which has five fingers and the other three as shown at 1, 2, 3, 4, 5, and 6, 7, 8, Fig. 3. In each of the fingers is a slot running the whole length of the finger as shown at 1, 2, 3, 4, 5, and 6, 7, 8. The end of the fingers turn down in a flange and through them five screws 9, 9, 9, 9, 9, pass immediately under the aforesaid slots 1, 2, 3, 4, 5. These screws turn on a journal at each end and on each of these screws are three screw nuts 11, 12, 11, Fig. 3. The nut 12 must be as thick as the felly is wide and on the top side are screws as shown at 13, 13, 13, 13, 13, which pass through the slots in the fingers and thereby fix the nut 12 at any desired position on the fingers; thereby securing the saws G, G, in any desired circle. The saws (of which there are two on the felly end of the arm F) have holes to correspond with the screws on the fingers and are hung on the screws 9, 9, 9, 9, 9, between the nuts 11 and 12 on each side of 12, and are adjusted to the desired circle by turning the screws 9, 9, 9, 9, 9, which moves the nuts 12 and when the desired circle of the saw is thus obtained the nuts 11, 11, are screwed up tightly to 12 holding securely the saws between them. The screws 13, 13, 13, 13, 13 are then turned down tight thereby fixing the saws secure on the hand, and at any circle required.

Figure 3:
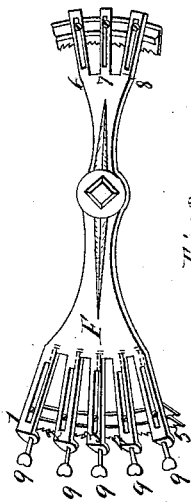

The saws are constructed in the usual manner and being thin and made of steel will bend so as to accommodate themselves to the circle desired. In the middle of each saw is a small lancet shaped blade or tooth as shown at 15 (Fig. 3). This tooth can be adjusted by means of a slot and a screw as shown in the drawing and when the machine is in operation is to be adjusted a little lower down than the saw teeth and being sharp it cuts the felly as smooth as if it were planed. The end of the saw arm with the three fingers shows the manner in which one saw may be used to saw circular stuff for chair backs, &c., in a manner to be hereinafter described.

Figure 5:
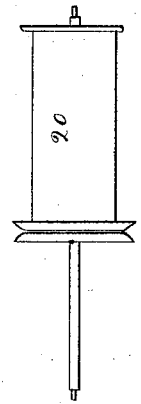
Figure 5:
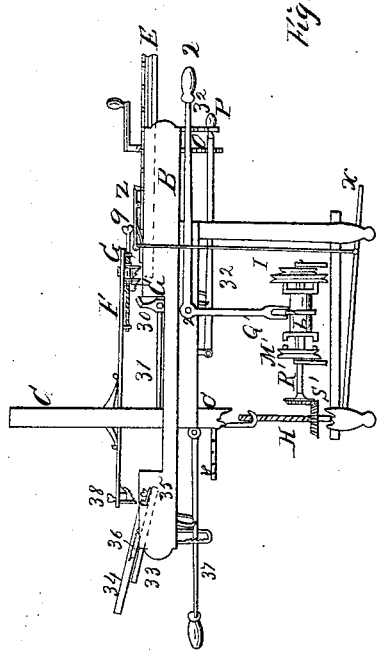

On the saw shaft 24 is an arm projecting out at right angles similar to the saw arm F and shown at V (Fig. 5). In this arm are several holes and in these holes the pitman t, t, (Fig. 1), is hooked which is worked by a crank on the end of the main shaft on which the band and fly wheel 21 and the driving pulley Y is hung; this gives the saw arm a lateral motion thereby causing the saws to perform a part of a circle back and forth and by means of the screw feed before described, the saws move down and cut both ways in their semi-revolutions; and by means of the screws 9, 9, 9, 9, 9, and the slots in the fingers before described they can be adjusted to move in a greater or a smaller circle to cut any sized felly desired.

E (Fig. 1) is a movable platform on which the plank to be sawed into fellies is placed. This platform slides in two grooves in the side frame B, B, and is stopped in the desired position by two dogs z, z, which work in a gage at each end of the platform E. These gages are made so as to be readily detached and their place supplied by others with "notches" or gage marks to suit the size and width of the felly desired to be sawed, and the dogs are worked by means of the treadle x and are thrown back to their place by springs.

K, K, is a vise (on the platform E which is operated by a screw M and a stirrup L L) which is screwed down on the plank to be sawed holding it securely to the platform E. There are also two dogs one of which is shown at 30 (Fig. 5) constructed alike which are also adjustable on the rod 31 by means of "set screws." The dogs are operated by means of the lever 32 which as the handle P is moved down the ratchet O causes the dogs to catch the plank to be sawed at the end and between the saws thereby holding it more securely; and these dogs can be moved along the rod 31, to correspond with the position of the saws. After the saws have cut through the plank it is "gigged back" by means of a contrivance shown in Fig. 5, in which Q, Q, Q' is a lever bent at right angles and at Q' formed into a fork. This fork works on a flange on the sliding dog L' which is made to move freely on the square part of the shaft R', so as alternately to throw the dog L' against the "loose band pulleys," M', and I. These pulleys are driven by bands from pulleys on the main or driving shaft (see Fig. 1) as shown at M. One of the bands is crossed as shown at 23 (Fig. 1) and consequently the pulleys M' and I, turn in opposite directions; and as the dog L' is brought into connection with the pulley I it causes the screw shaft H, to revolve so as to cause the saws to feed down into the plank, and when the dog L' is brought into contact with M' the screw shaft H is made to revolve in an opposite direction which "gigs" "back" the saws (it lifts the frame D, D, D, D).

32, Fig. 5, is a ratchet with three notches in its side. In these notches the lever 22 rests so that when it is in the lower notch the saws feed down and when it is in the upper notch the saws "gig back" and when it is in the middle notch the dog L' is between the pulleys M and I, and consequently the screw shaft, H, is not turned in either direction; thereby causing the saw frame D, D, D, D, to remain stationary, which of course stops the feed of the saws, until the lever Q, Q, Q', is again brought down into the lower notch.

Figure 2:
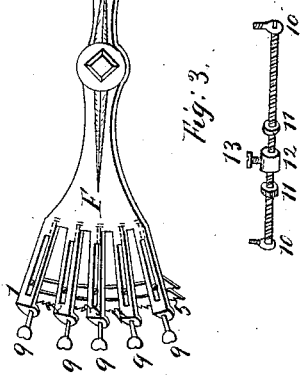
Figure 2:
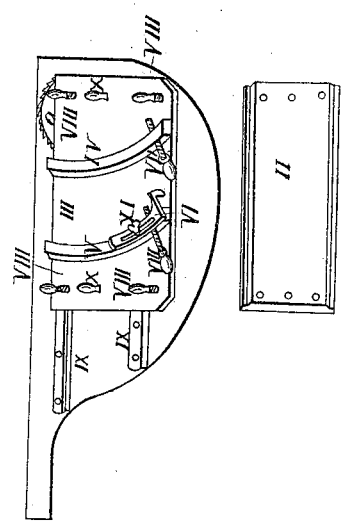

For sawing chair stuff my invention is constructed as follows, to wit, (see Fig. 5): 38 shows one of my saws screwed on a piece of wood shaped like a wagon felly which is then screwed on the short end of the saw arm F; 33 is a sliding platform which is made to slide in the side frames B, B at any desired angle; on the inside of the platform 33 is an adjustable gage 35 against which the edge of the plank 34 rests. This plank is held by two dogs one of which is shown at 36 (the other is on the opposite side). These dogs are worked by the lever 37 with a ratchet-catch to hold it securely; and when one piece is sawed off the plank is turned over and by this means one edge of the piece is sawed thicker than the other so as to be suitable for the purposes required. Now by adjusting the platform 33 level with B and screwing a saw on the inside of the block 38, small fellies for wheelbarrows may be sawed while larger ones for carriages are being sawed at the long end of the saw arm F. Now when the felly is sawed it is too long for the circle required and while the saws G, G, are "gigging back" the felly is laid on the platform III, (Fig. 2), in the concave side of the circular piece IV which is screwed on the platform III, so that one end of the felly rests against the gage screw VII and the other end projects past the buzz saw a (which saw is driven by a band from the band and fly wheel 21) and rests against IV; the platform III moves on slides IX IX (which are screwed on the saw table 40) (Fig. 1) by means of the slide board II to which it is secured by the screws X, X, which pass through a hole in the platform III and screw into the slide board II; while the screws VIII, VIII, VIII, VIII, serve to level it so as to square it with the saw a. Now when the felly is laid on the platform III the end from the saw a is moved off from IV by the screw VII until it lays at the proper angle and then holding it secure with one hand the operator slides the platform III up to the saw a when one end of the felly is cut off at the proper angle or bevel. The end of the felly which has been sawed off is now placed against the adjustable gage VI and resting against the gage screw VII; which passes through V a circular piece similar to IV and the end which has not been sawed off will project over the platform III and rest against V. The platform is then slid up as before when the remaining end of the felly is cut off at the proper angle and bevel and by means of the gage VI with a slot and screw XI it is cut off the exact length for the required number to fill the circle.

Figure 4:
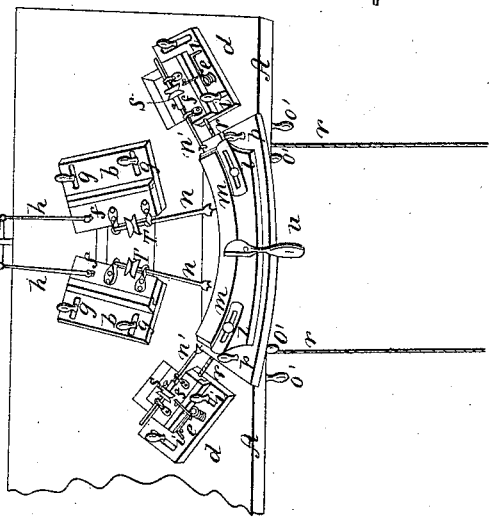

Now when the felly is sawed the proper circle and length it is bored as follows, to wit, (see Fig. 4): The felly m, m, is laid on the platform p, p, which can be raised or lowered at pleasure by means of the four screws o' o' o' o' which pass through the table top A A and on which the platform p, p, rests, while it is held securely to its place by means of the two screws p, p, which pass through the platform and screw into the table top A. A.

l, l, is a circular piece of board screwed onto the platform p, p, against which the felly m m rests and it is held down while being bored by means of the button, U, which is turned over it. The bottom of the button which rests on the felly is cut on an inclined plane or like a wedge so as to suit fellies of different thicknesses; there are also two adjustable gages l, l, with slots and screws by which the felly may be adjusted at the proper place to be bored. The felly is laid between the ends of the gages; the button $u$, is turned as represented in the drawing and the felly is ready to be bored.

$n$, $n$, are bits with which the holes for the spokes are bored. T, T, are pulleys on these bits which are turned by a band passed around the band roller 20 (Fig. 1). These bits turn on supports which are screwed on two pieces of board $f$ $f$ which are so constructed as to slide toward the felly $m$ $m$ by moving the handle and lever $v$.

$b$, $b$ are two platforms on which $f$ $f$ slide; these platforms have two slots in each as shown at $g$, $g$, $g$, $g$, with screws by which means they may be fixed nearer together or farther apart to suit the distances desired for the spokes; $n'$ $n'$ are two smaller bits constructed like $n$, $n$, only that instead of being moved up to the felly by a lever, there are two cords $r$, $r$, $r$, $r$, attached to the treadle $w$, (Fig. 1) and passing over two pulleys 41, 41, under the platform $p$, $p$; these cords are attached to the slides $f$, $f$, on which the bits $n'$ $n'$ are hung; $e$, $e$, are two spiral springs which draw the bits back when the foot is taken off the treadle $w$; the bits $n'$ $n'$ are driven by a band passing over the pulleys $s$, $s$, and on the band roller 20, which band roller is driven from a band over a pulley $m$ on the main shaft as shown at 22, (Fig. 1). The pulleys $s$ $s$ are fastened to the bits $n'$ $n'$ by a socket through which the bit passes and a set screw, so that the bits may be shoved through toward the felly or drawn back to suit fellies of any length required. The platforms $d$ $d$, are also adjusted at the desired position by slots and screws $i$, $i$, $i$, $i$.

By the arrangement and combination above described the fellies may be sawed off the right length and bored while the saws G, G, which cut the fellies are "gigging back" and when the machine would otherwise be running empty and by this construction no more power or workmen are required to do all the work than to saw alone or bore alone; for while the felly is being sawed the operator is adjusting one to be cut off and bored and while he is boring and cutting off a felly the saws, G, G, are moving up (or "gigging back") to the position necessary to be ready for sawing another, which could not be done if the work had to be performed on separate machines, while much expense of machinery is saved.

What I claim as my invention and desire to secure by Letters Patent of the United States is as follows, to wit:

1. I claim the saws constructed as described so that they may be adjusted to any required circle by means of the set screws 9, 9, 9, 9, 9, and also constructed as described at 38, Fig. 5, with the saw hand and fingers and slots and set screws combined as described; or any other construction substantially the same; I do not claim the saws alone but constructed and with the aforesaid combination as described.

2. I claim the contrivance and construction of platform III with the combination of gages and set screws as described, for cutting the felly the proper length or any other substantially the same.

3. I do not claim the bits driven by a band alone but I claim the combination described in Fig. 4, by which the bits for the spokes and dowel pins are made to move toward the felly at the same or different times as may be desired, by means of the combination and construction described or any other substantially the same.

A. B. RICHMOND.

Witnesses:
   James H. Lewis,
   William R. Daniels.